(12) United States Patent
Wang et al.

(10) Patent No.: US 10,817,532 B2
(45) Date of Patent: Oct. 27, 2020

(54) SCIENTIFIC COMPUTING PROCESS MANAGEMENT SYSTEM

(71) Applicant: SHENZHEN JINGTAI TECHNOLOGY CO., LTD., Guangdong (CN)

(72) Inventors: Yan Wang, Guangdong (CN); Xuekun Shi, Guangdong (CN); Yang Liu, Guangdong (CN); Peiyu Zhang, Guangdong (CN); Jian Ma, Guangdong (CN); Lipeng Lai, Guangdong (CN); Shuhao Wen, Guangdong (CN)

(73) Assignee: SHENZHEN JINGTAI TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/480,309

(22) PCT Filed: May 10, 2018

(86) PCT No.: PCT/CN2018/086318
§ 371 (c)(1),
(2) Date: Jul. 24, 2019

(87) PCT Pub. No.: WO2019/134323
PCT Pub. Date: Jul. 11, 2019

(65) Prior Publication Data
US 2019/0370264 A1    Dec. 5, 2019

(51) Int. Cl.
*G06F 16/25* (2019.01)
*G06F 16/23* (2019.01)
(Continued)

(52) U.S. Cl.
CPC ........ *G06F 16/254* (2019.01); *G06F 11/3433* (2013.01); *G06F 16/2358* (2019.01);
(Continued)

(58) Field of Classification Search
CPC ................ G06Q 10/067; G06F 16/254; G06F 16/24552; G06F 16/2465; G06F 16/2358; G06F 16/9024; G06F 11/3433
See application file for complete search history.

(56) References Cited

U.S. PATENT DOCUMENTS

2016/0260040 A1    9/2016    Zhou et al.

FOREIGN PATENT DOCUMENTS

| CN | 103279840 | 9/2013 |
|----|-----------|--------|
| CN | 107203421 | 9/2017 |

(Continued)

OTHER PUBLICATIONS

Morrell, William C., et al. "The experiment data depot: a web-based software tool for biological experimental data storage, sharing, and visualization." ACS synthetic biology 6.12 (2017): 2248-2259. (Year: 2017).*

(Continued)

*Primary Examiner* — Usmaan Saeed
*Assistant Examiner* — William P Bartlett
(74) *Attorney, Agent, or Firm* — JCIP Global Inc.

(57) ABSTRACT

The invention provides a scientific computing process management system. The system includes a basic data presentation layer for storing and presenting business models, a case service module for providing addition, deletion, checking, and changing as well as task submission and data analysis triggering of a case contained in an interface, computing service modules released as a packaged based image and called through a task scheduling system, a resource statistic service module for providing computing resource consumptions statistics accurate to a task level, a persistent layer for persisting data, an audit module for performing audit work on universal data changes and performing backtracking when data is in an unexpected state, a real-time sync module for performing data synchronization in real time together with the task scheduling system, an async communication module for processing computing service communication and an async analysis module for performing analysis in a pushing process of a case.

3 Claims, 5 Drawing Sheets

(51) Int. Cl.
  *G06F 16/2455* (2019.01)
  *G06F 16/901* (2019.01)
  *G06F 16/2458* (2019.01)
  *G06F 11/34* (2006.01)
  *G06Q 10/06* (2012.01)
(52) U.S. Cl.
  CPC .... *G06F 16/2465* (2019.01); *G06F 16/24552* (2019.01); *G06F 16/9024* (2019.01); *G06Q 10/067* (2013.01)

(56) References Cited

FOREIGN PATENT DOCUMENTS

CN   107203422   9/2017
CN   107577586   1/2018

OTHER PUBLICATIONS

Chard, Ryan, et al. "DLHub: Model and data serving for science." 2019 IEEE International Parallel and Distributed Processing Symposium (IPDPS). IEEE, 2019. (Year: 2019).*
"International Search Report (Form PCT/ISA/210) of PCT/CN2018/086318," dated Jan. 30, 2019, with English translation thereof, pp. 1-4.

* cited by examiner

SCIENTIFIC COMPUTING PROCESS MANAGEMENT SYSTEM

CROSS-REFERENCE TO RELATED APPLICATION

This application is a 371 of international application of PCT application serial no. PCT/CN2018/086318, filed on May 10, 2018. The entirety of the above-mentioned patent application is hereby incorporated by reference herein and made a part of this specification.

BACKGROUND OF THE INVENTION

1. Technical Field

The invention belongs to the field of scientific computing, and particularly relates to a scientific computing process management system.

2. Description of Related Art

In the past ten years, with the rapid development of cloud computing, data storage and data analysis technologies, a big data era is gradually emerging before us; and the combination of a scientific computing workflow and cloud computing has gradually become a hot topic that is attracting a lot of attention from people.

The scientific computing workflow indicates that a series of work, such as data management, data computing, data analysis and data presentation, in scientific research is turned into independent services, and then these independent services are combined together through data connection to meet the requirements of researchers for scientific experiments and data analysis, so that corresponding processing and computing are realized. Due to the complexity of scientific computing, the scientific computing workflow gradually turns computation-intensive and data-intensive, and therefore, earlier deployment, execution of the scientific computing workflow, later data processing and data analysis and other work have high computation requirements as well as a huge storage space. Although cloud computing provides a distributed network computing technology for the scientific computing workflow, the complexity, long computing interval, large data throughout, analysis monitoring diversification and the like of the scientific computing workflow still need to be concerned and settled. In existing computing, the visualization of real-time data analysis is poor, the coordination of scientific computing items is poor, a computing process is separated from earlier approval as well as later analysis and summary, the computing interval is long, the process is complex, the operating cost is high, and the controllability is poor.

BRIEF SUMMARY OF THE INVENTION

Aiming at the above technical issues, the invention provides a scientific computing process management system which is easier to operate. The technical scheme adopted by the invention is as follows:

The scientific computing process management comprises following modules.

A basic data presentation layer, wherein the basic data presentation layer is responsible for storing and presenting a "case" business model, a "task" business model, a "data preparing" business model, an "analysis" business model and a "resource statistic" business model, basic data is stored in an ArangoDB graph database, and the data presentation layer is established by SDK to provide a business base for other modules.

A case service module, wherein the case service module is established on the basis of a Flask frame, is presented as a REST form and provides the addition, deletion, check and changes as well as task submission and data analysis triggering of a case contained in an interface.

Computing service modules, wherein the computing service modules are released as a Docker image in a packaged manner by means of various computing units packaged in an algorithms library and are called through the task scheduling system in a parameter transfer manner.

A resource statistic service module, wherein the resource statistic service module provides computing resource consumption statistic accurate to a task level so as to provide a valid reference for cost control.

A persistent layer, wherein the persistent layer comprises multiple databases and a cache service; the databases are used for realizing the persistence of data including basic data, structured data generated by a computing service, as well as resource data for a resource statistic service, of the whole system, and a cache is used for realizing temporary storage of intermediate data generated in the running processes of the computing service and the resource statistic service.

An audit module, wherein the audit module performs audit work on universal data changes and conveniently and effectively performs backtracking when data is in an unexpected state; any changes to the basic data are recorded by the system, each change log is packaged as a structured record and is then pushed to a big data search and analysis engine, and each record contains the following information: operation time, operation type, operated object, operator, key request context and changed data.

A real-time sync module, wherein the real-time sync module performs data synchronization in real time together with the task scheduling system, and synchronized data includes the task status and the finish time; and the real-time sync module comprises a background resident process which continuously scans an unmarked task, requests the latest status from the task scheduling system in a merged manner and updates the latest status to a basic data storage.

An async communication module, wherein the async communication module asynchronously processes computing service communication, perceives a key event through AWS SQS information and dynamically collects computing results.

An async analysis module, wherein the async analysis module automatically performs analysis in the pushing process of a case, or submits a user-defined analysis task through a control console and automatically distributes an analysis task by presetting a triggering condition.

Business process management is one of most important and active conceptions under the background of information technology application (informatization) of enterprises since the beginning of this century; from a management point of view, the business process management can be regarded as the continuation and development of a management thought which takes a business process as a centre and is brought by business process reengineering (BPR); and from an enterprise application point of view, the business process management is developed on the basis of a Workflow and other technologies and is a new generation of enterprise application system core which supports, based on business process modelling, analysis, modeling, simulation, optimization, cooperation, monitoring and the like of a business process.

In industry 4.0, the transformation of a fundamental mode from centralized control to distributed enhanced control is described, and a highly-flexible individual and digital product and service production mode is established through a proposal of "intelligent plant", "intelligent production", and "intelligent logistics". According to the production mode, the representation of the entire network is automatically optimized, a new ambient condition is learned in real time or almost in real time and automatically adapted, and a whole production process is automatically performed, so that a flexible system is formed, and intelligentization is better realized.

According to the scientific computing process management system provided by the invention, the complex workflow is disassembled; on the macro level, the overall situation is grasped through planning on the whole work of scientific computing; and on the micro level, management, monitoring and data analysis are performed with disassembled steps as independent management units.

According to the scientific computing process management system provided by the invention, the robustness of a scientific computing process is improved, the operation is smoother, and the system complexity is reduced, so that the user experience is improved; and the control over a whole process is improved, the resource utilization rate is improved, and the labor cost is reduced.

DETAILED DESCRIPTION OF THE INVENTION

The specific technical scheme of the invention is described in combination with embodiments.

Figure 1:
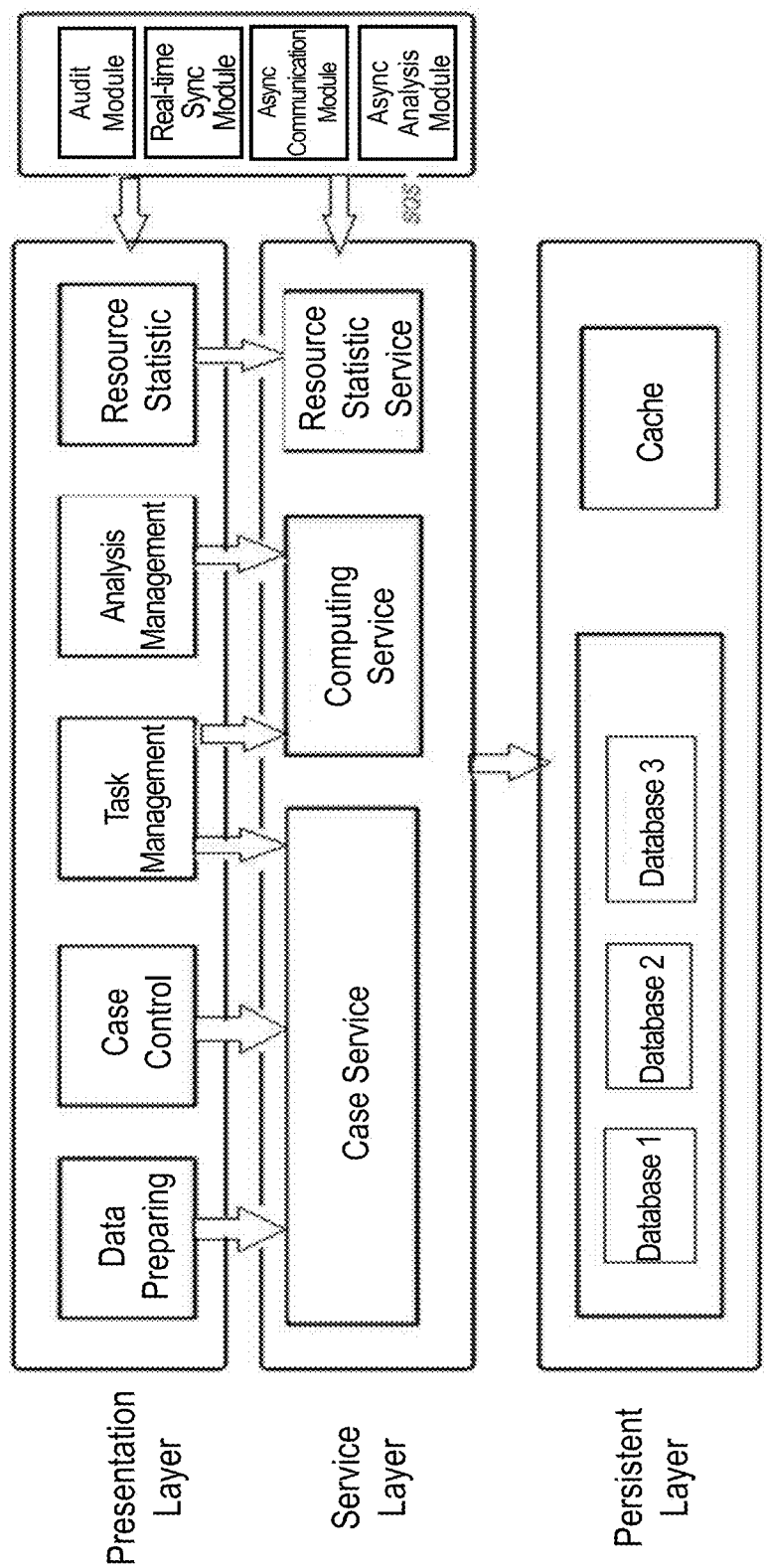
FIG. 1 is a system architecture of the invention.

The scientific computing process management system is established through abstract modeling performed on the dependency relationship of the process of scientific computing, resources related to read-write, as well as operation steps and is established based on a "distributed storage service", a "distributed task scheduling system", and an "open-source or self-research algorithms library". As shown in FIG. 1, the scientific computing process management system includes following modules.

A basic data presentation layer, wherein the basic data presentation layer is responsible for storing and presenting a "case" business model, a "task" business model, a "data preparing" business model, an "analysis" business model and a "resource statistic" business model, basic data is stored in an ArangoDB graph database, and a data presentation layer is established by SDK to provide a business base for other modules;

a case service module, wherein the case service module is established on the basis of a Flask frame, is presented as a REST form and provides the addition, deletion, checking, and changes as well as task submission and data analysis triggering of a case contained in an interface, as well as task submission and data analysis triggering.

Computing service modules, wherein the computing service modules are released as a Docker image in a packaged manner by means of various computing units, such as clustering and ranking, packaged in an algorithms library and are called through the task scheduling system (a FACES cloud computing resource scheduling platform, 2016SR096169) in a parameter transfer manner.

A resource statistic service module, wherein the resource statistic service module provides computing resource consumption statistics accurate to a task level so as to provide a valid reference for cost control.

A persistent layer, wherein the persistent layer comprises multiple databases and a cache service; the databases are used for realizing the persistence of data, such as basic data (ArangoDB), structured data (ArangoDB) generated by a computing service as well as resource data (ArangoDB) generated by a resource statistic service, of the whole system, and a cache is used for realizing temporary storage of intermediate data generated in the running processes of the computing service and the resource statistic service.

A real-time sync module, wherein the real-time sync module performs data synchronization in real time together with the task scheduling system, and synchronized data includes the task status and the finish time; and in order to prevent performance problems caused by acquiring a task status when a task list is acquired, a background resident process which continuously scans an unmarked task, requests the latest status from the task scheduling system in a merged manner, and updates the latest status to a basic data storage is adopted.

Async communication module, wherein the async communication module asynchronously processes computing service communication, perceives a key event through AWS SQS information and dynamically collects computing results.

An audit module, wherein the audit module performs audit work on universal data change and conveniently and effectively performs backtracking when data is in an unexpected state, any changes to the basic data are recorded by the system, each change log is packaged as a structured record and is then pushed to an ElasticSearch, and each record contains the following information: operation time, operation type, operated object, operator, key request context and changed data.

An async analysis module, wherein the async analysis module automatically performs analysis in the pushing process of a case, or submits a user-defined analysis task through a control console and automatically distributes an analysis task by presetting a triggering condition (such as combination of a task type and the task status); an operator can directly check an analysis result on the control console without waiting for a result after manually triggering the analysis task; and when a special analysis parameter needs to be set, the operator can still manually trigger the analysis task on the control console.

Figure 2:
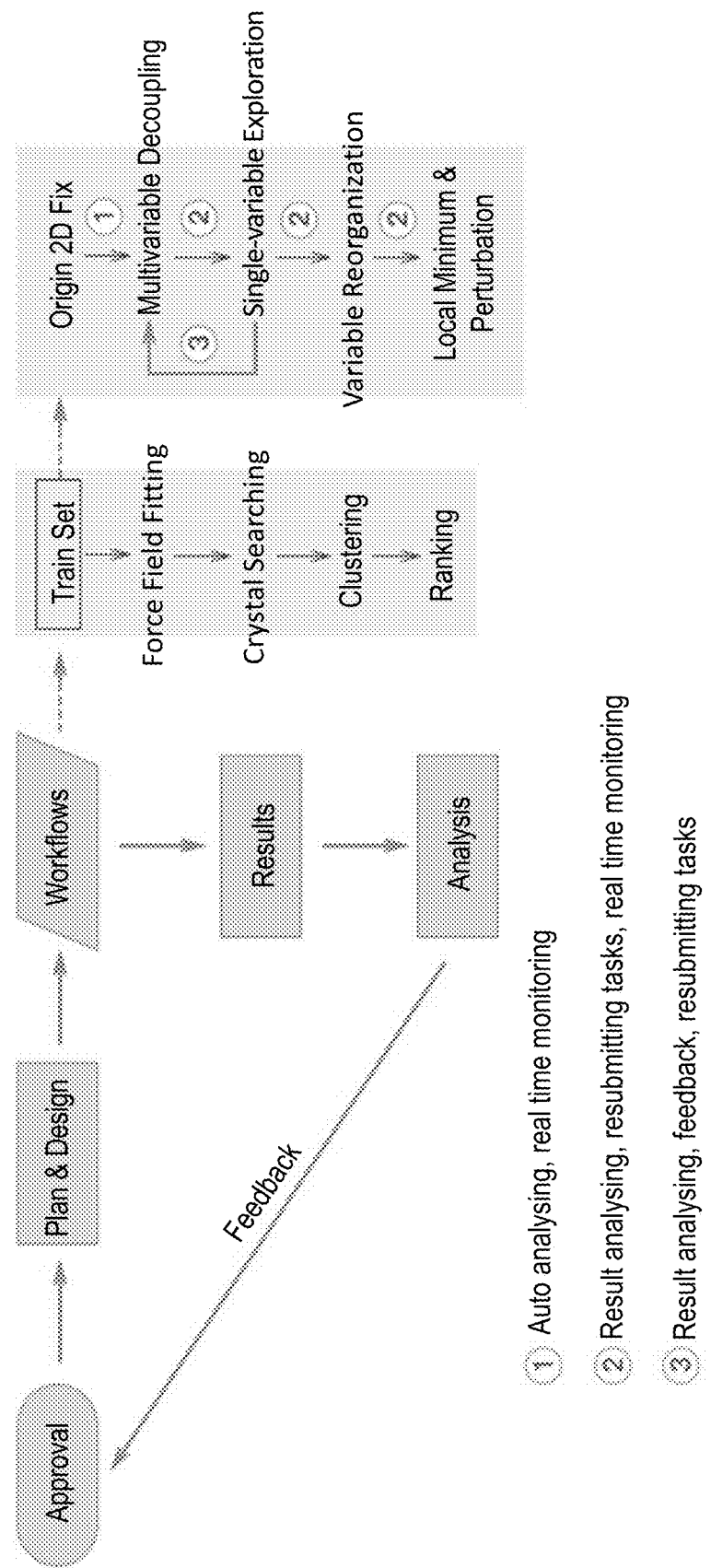
FIG. 2 is a method flow chart of one embodiment.

The core of the scientific computing process management system lies in the management of a scientific computing process. In this embodiment, a whole workflow is disassembled according to computing software, a system environment, a computing type and the like; the status and the progress during the whole plan of each type of tasks are presented in a Gantt form; "long-period computing" is completed through a series of controllable computing links which are moderate in time consumption; and the standard process of scientific computing is shown in FIG. 2 and wholly includes "train set establishment", "force field fitting", "crystal searching", "clustering", and "ranking", wherein a "train set establishment" step is disassembled as follows:

(1) Original 2D Fix: a single task needs a running environment of 32 core, 64G and a supercomputing platform and consumes 2.5 hours; xx monitors a task progress, automatically submits an analysis task when the task is finished and provides an objective result, and an operator inspects the objective result and then submits the computing for the next step.

(2) Multivariable decoupling: 11 parallel tasks need a running environment of 32 core, 64G and a FACES cloud platform (the FACES cloud platform is called "cloud platform" for short), and each task consumes 2 hours on average, so that 22 hours are consumed in total; and xx monitors the progresses of the tasks and automatically submits the next task when the current task is finished, and an operator can manually trigger analysis and check a current computing result.

(3) Single-variable exploration: 60 parallel tasks need a running environment of 32 core, 64G and the cloud platform, and each task consumes 2 hours on average, so that 120 hours are consumed in total; and the system throws an error pattern while monitoring that the corresponding task is in a "failure" status, an operator participates in adjusting computing parameters, and then the corresponding computing task is started again from the previous step.

(4) Variable reorganization: 96 parallel tasks need a running environment of 32 core, 64 G and the cloud platform, and each task consumes 2.5 hours on average, so that 240 hours are consumed in total.

(5) Local minimum and perturbation: 200 parallel tasks need a running environment of 32 core, 64 G and the cloud platform, and each task consumes 1 hour on average, so that 200 hours are consumed in total.

In this way, original computing requirements are met, and the following effects are fulfilled:

1. Resources can be better scheduled through the cloud platform in disassembled computing links, so that the resource utilization rate is improved.

2. The disassembled computing links are relatively independent and have more definite computing objects, so that comprehension complexity is wholly reduced.

Figure 3:
FIG. 3 is a front interactive page of a scientific computing process management system of the embodiment.

3. Certain user-oriented interactive operations are adopted, so that the overall operation smoothness is improved, and the labor cost is reduced. A front interactive page of the scientific computing process management system is shown in FIG. 3. The front interactive page of the scientific computing process management system mainly includes global operation (a bottom menu bar) and a Gantt chart; the global operation includes: 1. case name and create time; 2. total current time consumption (a figure inside a circle is shown in FIG. 3); 3. data preparing: an approval object and planning of a case as well as data provided by clients can be shown through click; 4. original configuration: a list of structures generated by task "original molecules" (see tasks at the bottommost part of the Gantt chart); 5. analysis view: an analysis chart of the tasks can be browsed through clicking; 6. force field list: a list of force fields generated in batched force field fitting.round1 ("batched force field fitting.r1") of the corresponding task; 7. structure pool list: a structure bucket ID list generated in "crystal searching.roundl" ("crystal searching.rl") and "crystal searching.roundl.test"("crystal searching.rl.test") of the corresponding task; 8. new task: a new task can be added through clicking; 9. grouping: as shown in the Gantt chart, each behavior represents a task, a folder is a sign of a task group, in the name of the corresponding task, a label of the corresponding task is behind "a dot", and all labels of current tasks are shown through a "grouping" function; 10. comment list: as shown in the Gantt chart, a "task view" on a second column indicates whether the corresponding task has an analysis chart or comments, grey indicates that the corresponding task does not have an analysis chart and comments, and all comments of the corresponding case are shown in the "comment list"; 11. on-line report tool: an interfaced "full view analysis system of a medical crystal structure"; 12. Gantt chart: "task number", "task name", "task view" (the "analysis chart" and the "comments") and task status (quantity statistics of the tasks in six status, such as "waiting/running/done" and "false/pause/stop")) are respectively described in five columns on the left side of the Gantt chart, the occurrence time and finishing time of the tasks are showed on the right side of the Gantt chart in a Gantt chart form, and in the first row, an upper block indicates real running data, and a lower block indicates operating data predicted by an operator.

Figure 4:
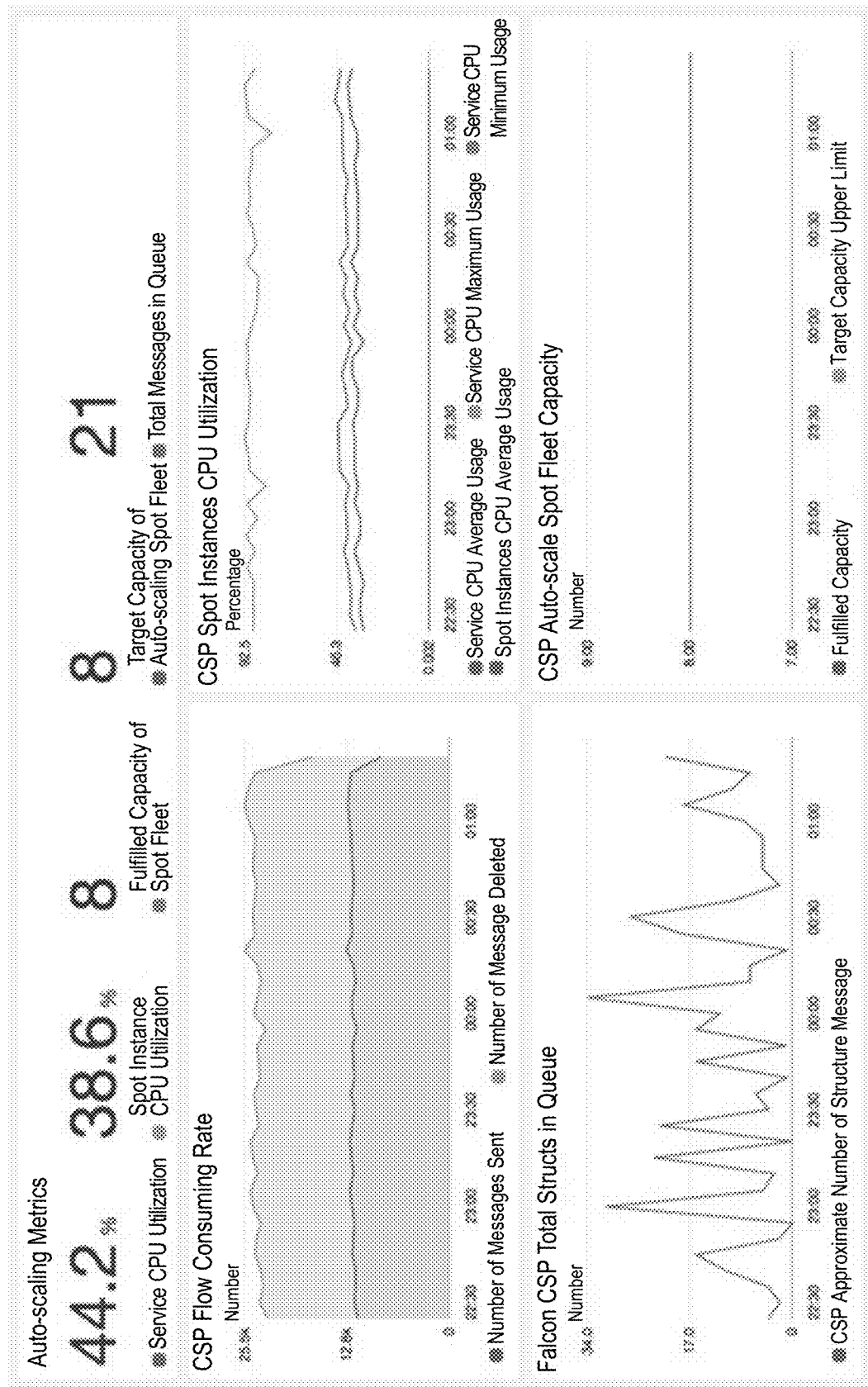
FIG. 4 is a queue monitoring diagram of the embodiment.

4. The tasks are independently monitored in combination with the difference of the computing links on resource demand, environment configuration and the like, and meanwhile, the scheduling status of resources in the cloud is monitored, so that error discovery is enhanced while monitoring intensity is improved, and resource waste caused by errors is reduced, as shown in FIG. 4.

5. The computing links of all type are relatively independent, data structures can be independently designed, and the backtracking of later data analysis of logs and other data can be improved.

6. The computing links are independent, so that data throughput is controllable, and abnormal errors, system pressure, and the like are reduced.

7. Time cost is controllable, and after approval is performed, all of the computing is planned, each link in the process is designed, an object of each link is confirmed, the time is more definite, and actual time consumption will not be excessively different from predicted time consumption.

Figure 5:
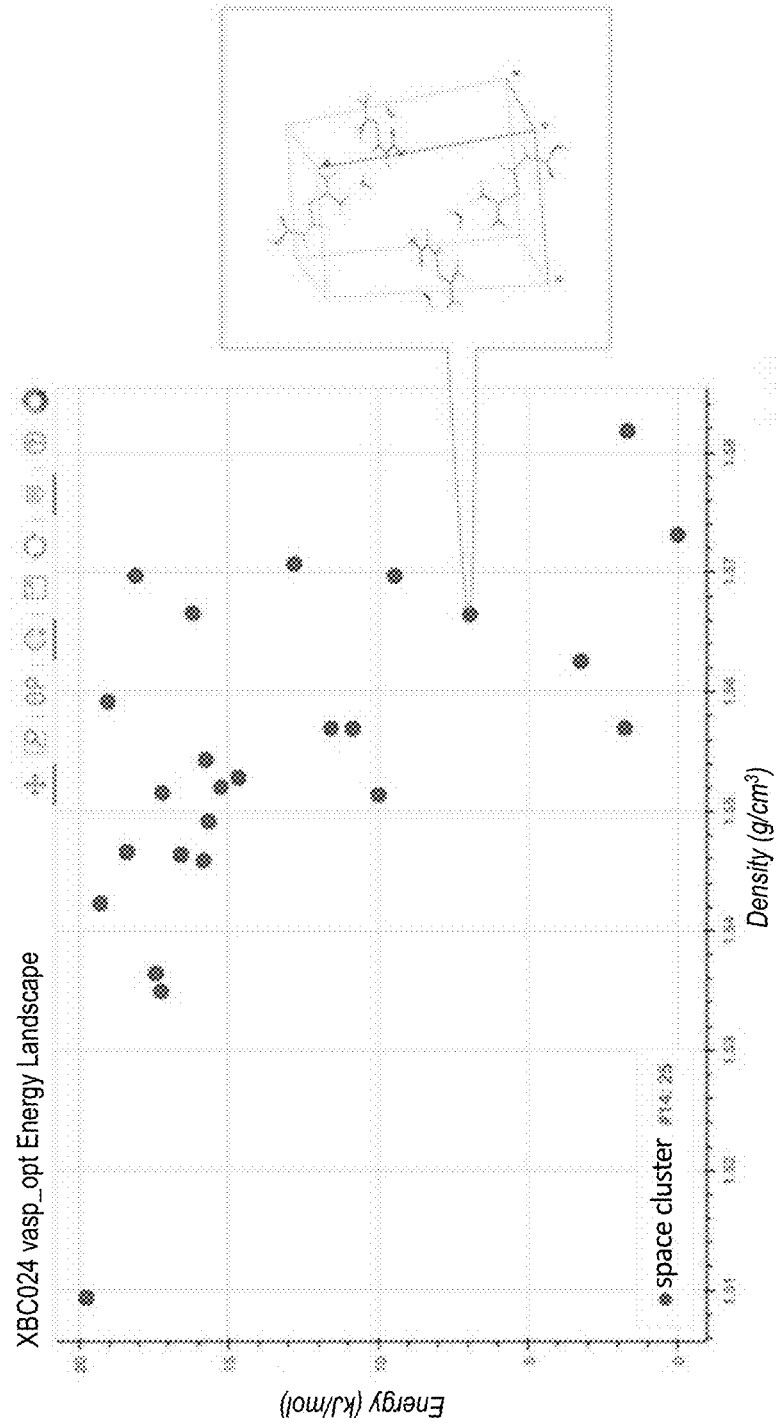
FIG. 5 is a visualized analysis result of task data of the embodiment.

8. An approval object is back browsed in combination with the computing results and analysis of each link, whether a theory and an assumption are correct or not can be verified, and the correctness of a whole direction can be controlled through appropriate adjustment. The analysis chart of "energy ranking analysis.r1" in the above example is shown in FIG. 5, and a predicted result of this round is described.

What is claimed is:

1. A scientific computing process management system, comprising a processor, configured to execute:
    a basic data presentation layer, wherein the basic data presentation layer is responsible for storing and presenting a "case", a "task", a "data preparing", an "analysis" and a "resource statistic" business model, basic data is stored in a graph database, and a data presentation layer is established by a software development kit to provide a business base for modules;
    a case service module, wherein the case service module is established based on a Flask frame, is presented as a REST form, and provides addition, deletion, checking, and changes as well as task submission and data analysis triggering of a case contained in an interface;
    computing service modules, wherein the computing service modules are released as a package-based image by utilizing various computing units packaged in an algorithms library and the package-based image is called through a task scheduling system based on a parameter;

a resource statistic service module, wherein the resource statistic service module provides computing resource consumption statistics accurate to a task level so as to provide a valid reference for cost control;

a persistent layer, wherein the persistent layer comprises multiple databases and a cache service, the multiple databases persist data including basic data, structured data generated by a computing service, as well as resource data generated by a resource statistic service, for the scientific computing process management system, and a cache that temporarily stores intermediate data generated in running processes of the computing service and the resource statistic service;

an audit module, wherein the audit module performs audit work on universal data changes and performs backtracking when data is in an unexpected state; any changes to the basic data are recorded by the system scientific computing process management system, each change log is packaged as a structured record and is then pushed to a big data search and analysis engine, and the structured record contains the following information: operation time, operation type, operated object, operator, key request context and changed data;

a real-time sync module, wherein the real-time sync module performs data synchronization in real time together with the task scheduling system, and synchronized data includes a task status and a finish time; and the real-time sync module comprises a background resident process which continuously scans an unmarked task, requests a latest status merged from the task scheduling system and updates the latest status to a basic data storage;

an async communication module, wherein the async communication module asynchronously processes computing service communication, identifies a key event through SQS information and dynamically collects computing results; and an async analysis module, wherein the async analysis module automatically performs analysis in a pushing process of a case, or submits a user-defined analysis task through a control console and automatically distributes an analysis task by presetting a triggering condition.

2. A non-transitory computer-readable recording medium, characterized by:

a basic data presentation layer, wherein the basic data presentation layer is responsible for storing and presenting a "case", a "task", a "data preparing", an "analysis" and a "resource statistic" business model, basic data is stored in a graph database, and a data presentation layer is established by a software development kit to provide a business base for modules;

a case service module, wherein the case service module is established based on a Flask frame, is presented as a REST form, and provides addition, deletion, checking, and changes as well as task submission and data analysis triggering of a case contained in an interface;

computing service modules, wherein the computing service modules are released as a package-based image by utilizing various computing units packaged in an algorithms library and the package-based image is called through a task scheduling system based on a parameter;

a resource statistic service module, wherein the resource statistic service module provides computing resource consumption statistics accurate to a task level so as to provide a valid reference for cost control;

a persistent layer, wherein the persistent layer comprises multiple databases and a cache service, the multiple databases persist data including basic data, structured data generated by a computing service, as well as resource data generated by a resource statistic service, and a cache that temporarily stores intermediate data generated in running processes of the computing service and the resource statistic service;

an audit module, wherein the audit module performs audit work on universal data changes and performs backtracking when data is in an unexpected state; any changes to the basic data are recorded by the non-transitory computer-readable recording medium, each change log is packaged as a structured record and is then pushed to a big data search and analysis engine, and the structured record contains the following information: operation time, operation type, operated object, operator, key request context and changed data;

a real-time sync module, wherein the real-time sync module performs data synchronization in real time together with the task scheduling system, and synchronized data includes a task status and a finish time; and the real-time sync module comprises a background resident process which continuously scans an unmarked task, requests a latest status merged from the task scheduling system and updates the latest status to a basic data storage;

an async communication module, wherein the async communication module asynchronously processes computing service communication, identifies a key event through SQS information and dynamically collects computing results; and an async analysis module, wherein the async analysis module automatically performs analysis in a pushing process of a case, or submits a user-defined analysis task through a control console and automatically distributes an analysis task by presetting a triggering condition.

3. A scientific computing process management method, comprising:

storing and presenting a "case", a "task", a "data preparing", an "analysis" and a "resource statistic" business model in a basic data presentation layer, wherein basic data is stored in a graph database, and providing a business base for modules by a data presentation layer established by a software development kit;

providing addition, deletion, checking, and changing as well as task submission and data analysis triggering of a case contained in an interface by a case service module, wherein the case service module is established based on a Flask frame, and is presented as a REST form;

releasing computing service modules as a package-based image by utilizing various computing units packaged in an algorithms library and the package-based image is called through a task scheduling system based on a parameter;

providing computing resource consumption statistics accurate to a task level so as to provide a valid reference for cost control by a resource statistic service module;

persisting data including basic data, structured data generated by a computing service, as well as resource data generated by a resource statistic service by multiple databases, and temporarily storing intermediate data generated in running processes of the computing service and the resource statistic service by a cache, wherein the multiple databases and a cache service of the cache are in a persistent layer;

performing audit work on universal data changes and performing backtracking when data is in an unexpected state by an audit module, wherein any changes to the basic data are recorded, and each change log is packaged as a structured record and is then pushed to a big data search and analysis engine, and the structured record contains the following information: operation time, operation type, operated object, operator, key request context and changed data;

performing data synchronization in real time together with the task scheduling system by a real-time sync module, wherein synchronized data includes a task status and a finish time, and the real-time sync module comprises a background resident process which continuously scans an unmarked task; and requesting a latest status merged from the task scheduling system and updating the latest status to a basic data storage by the real-time sync module;

asynchronously processing computing service communication, identifying a key event through SQS information and dynamically collecting computing results by an async communication module;

automatically performing analysis in a pushing process of a case, or submitting a user-defined analysis task through a control console and automatically distributing an analysis task by presetting a triggering condition by an async analysis module.

* * * * *